United States Patent [19]

Tzur

[11] Patent Number: 4,632,865
[45] Date of Patent: Dec. 30, 1986

[54] MULTI-LAYER INTUMESCENT-ABLATOR ENDOTHERMIC FIRE RETARDANT COMPOSITIONS

[75] Inventor: Avi Tzur, Englewood, N.J.

[73] Assignee: Mediavault Inc., Englewood Cliffs, N.J.

[21] Appl. No.: 797,623

[22] Filed: Nov. 13, 1985

[51] Int. Cl.[4] .......................... B32B 3/26; B32B 5/18
[52] U.S. Cl. .............................. 428/304.4; 428/319.1; 428/699; 428/920; 428/921
[58] Field of Search .............. 428/304.4, 306.6, 307.3, 428/307.7, 308.4, 312.2, 312.4, 312.8, 319.1, 699, 920, 921

[56] References Cited

U.S. PATENT DOCUMENTS

| | | | |
|---|---|---|---|
| 3,934,066 | 1/1976 | Murch | 428/319.1 |
| 3,991,252 | 11/1976 | Kolakowski et al. | 428/921 |
| 4,276,332 | 6/1981 | Castle | 428/921 |
| 4,310,587 | 1/1982 | Beaugre | 428/319.1 |
| 4,324,835 | 4/1982 | Keen | 428/308.4 |
| 4,374,171 | 2/1983 | McCarter | 428/921 |
| 4,381,716 | 5/1983 | Hastings et al. | 428/921 |
| 4,405,682 | 9/1983 | Fujita et al. | 428/319.1 |
| 4,451,312 | 5/1984 | Nolte | 428/921 |

Primary Examiner—William J. Van Balen
Attorney, Agent, or Firm—Abelman Frayne Rezac & Schwab

[57] ABSTRACT

Intumescent-ablator fire retardant materials, in the form of multi-layers, is described. These materials are used for fire-retardant and heat protective purposes.

22 Claims, 17 Drawing Figures

POINT 1 - TIME FIRE STOPPED - CURVE B
POINT 2 - TIME FIRE STOPPED - CURVE A
tPA       - PLATEAU LENGTH - CURVE A
tPB       - PLATEAU LENGTH - CURVE B

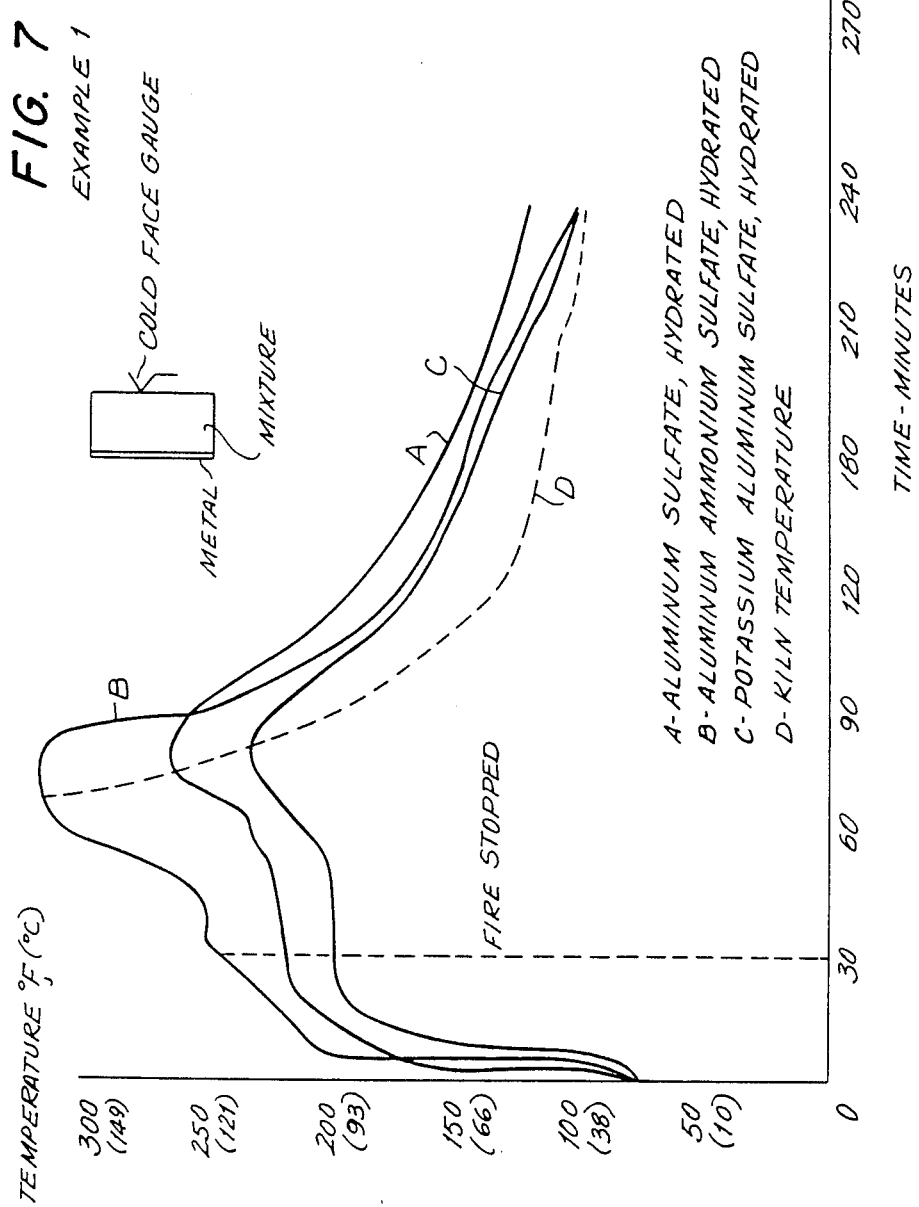

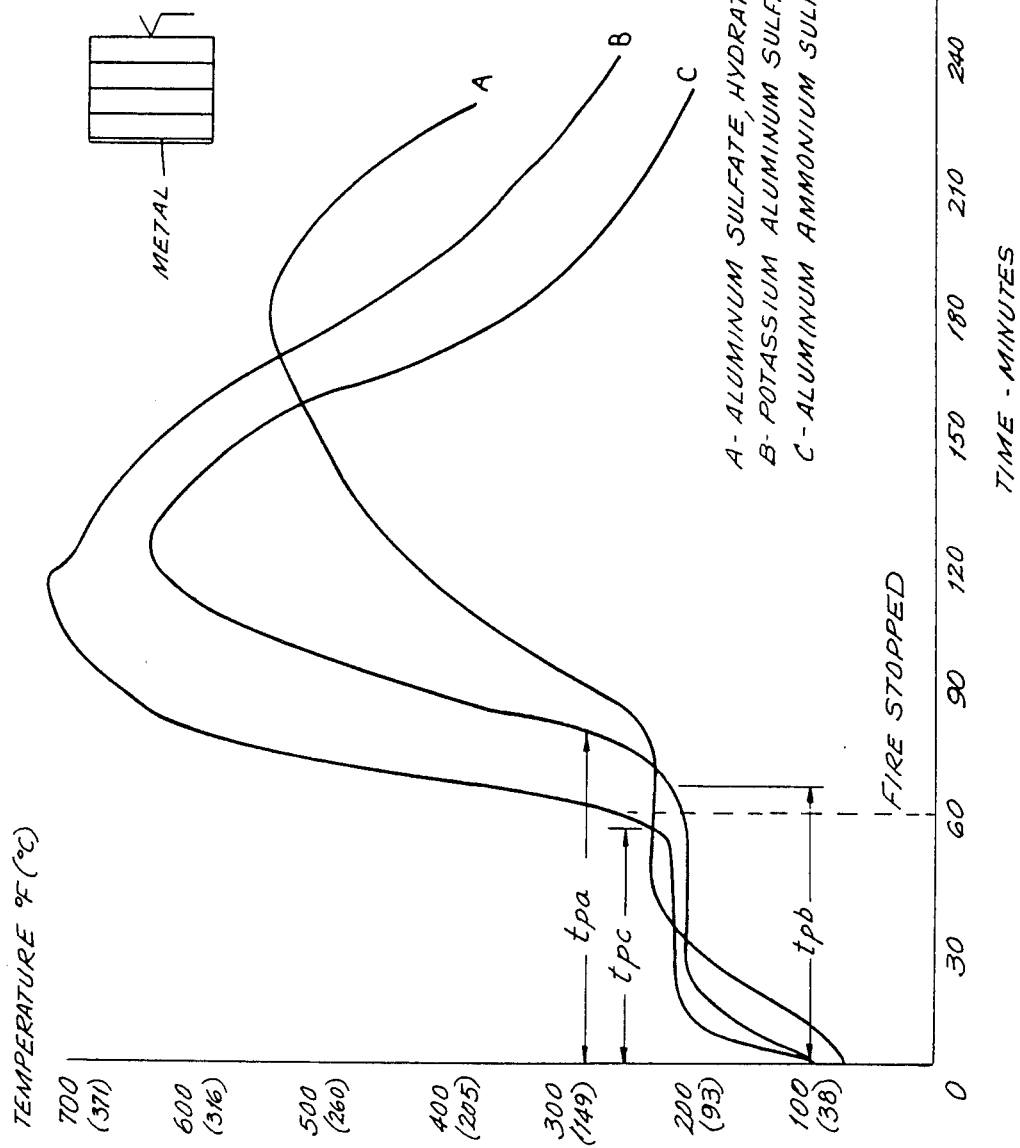

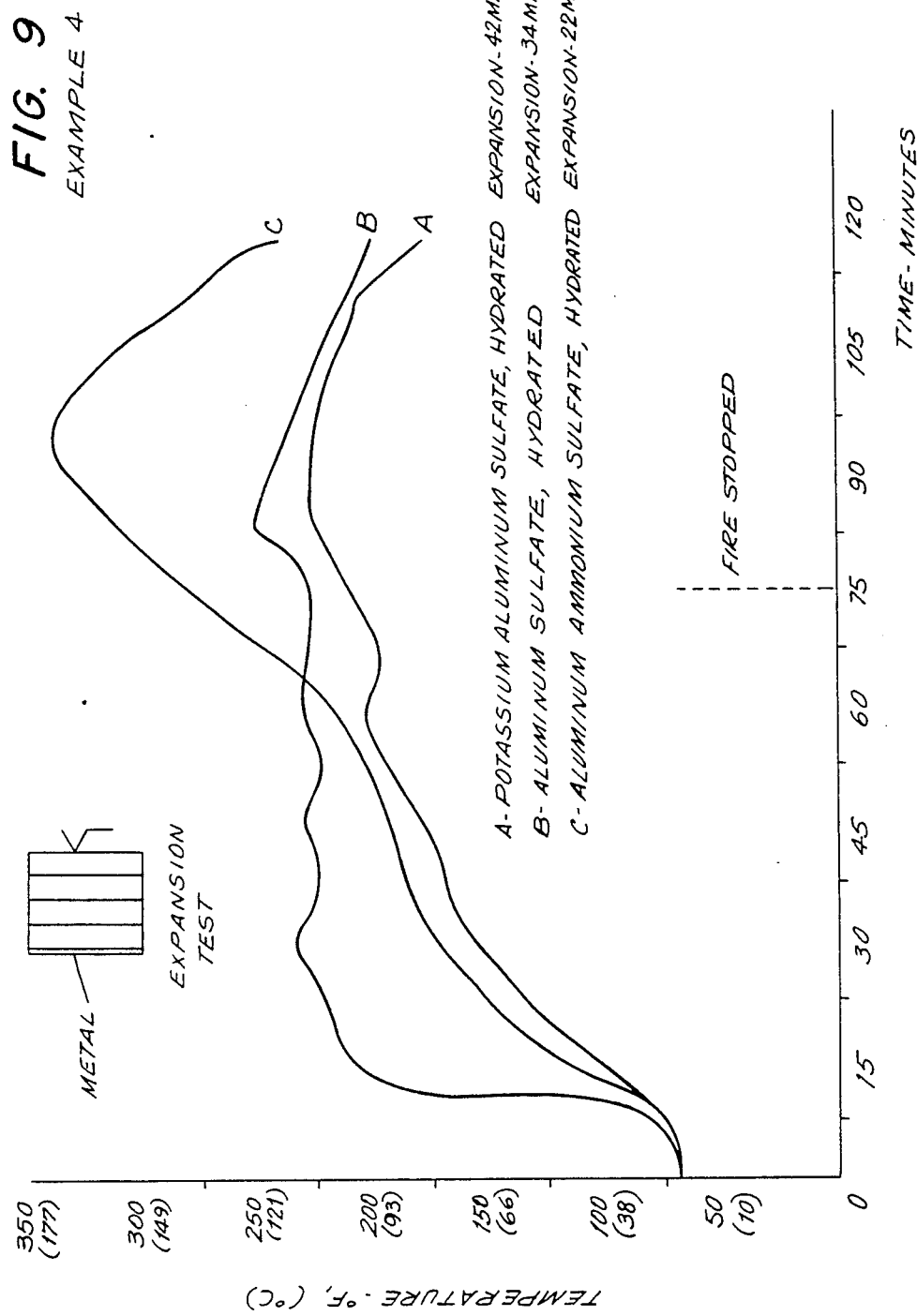

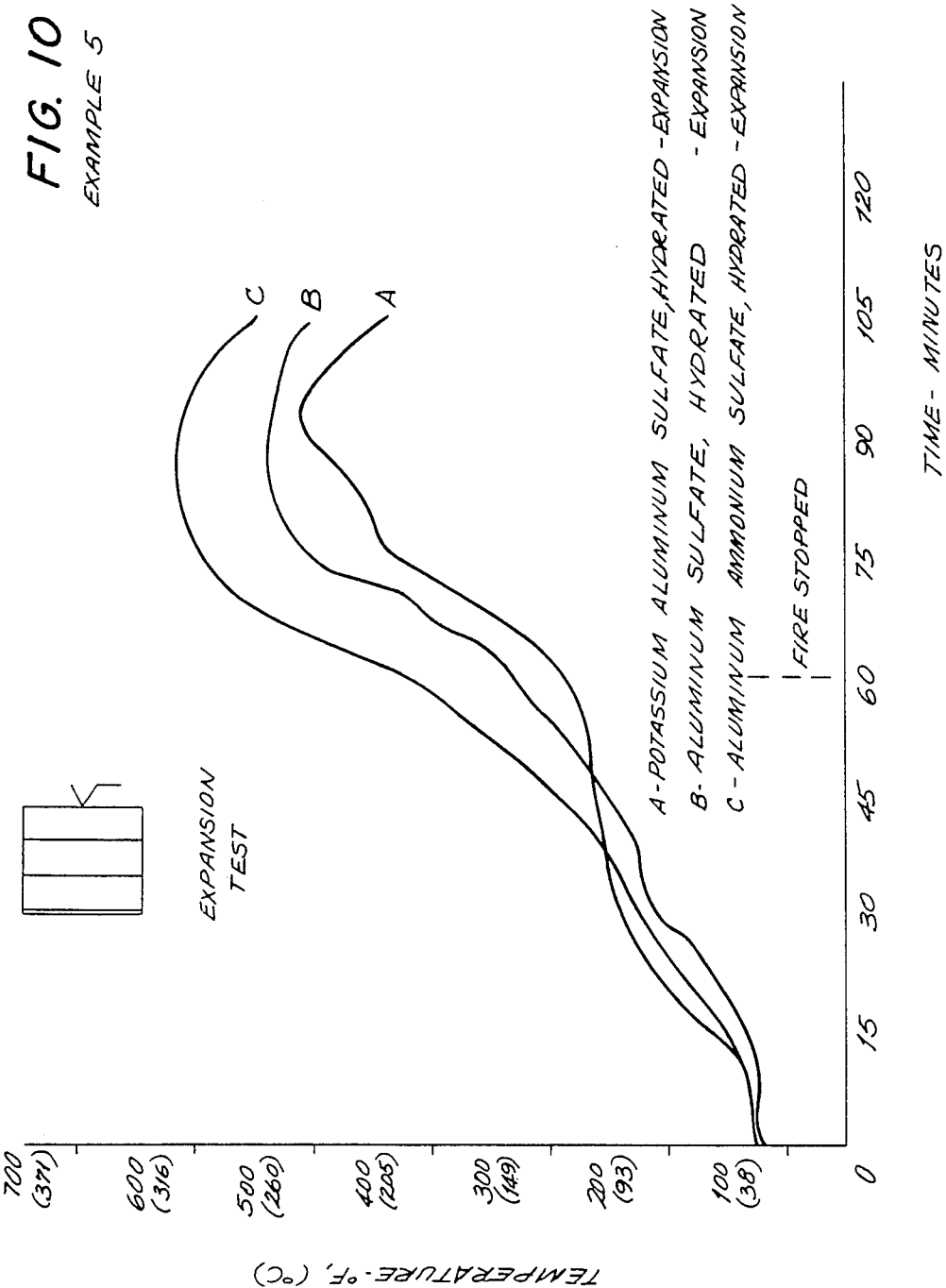

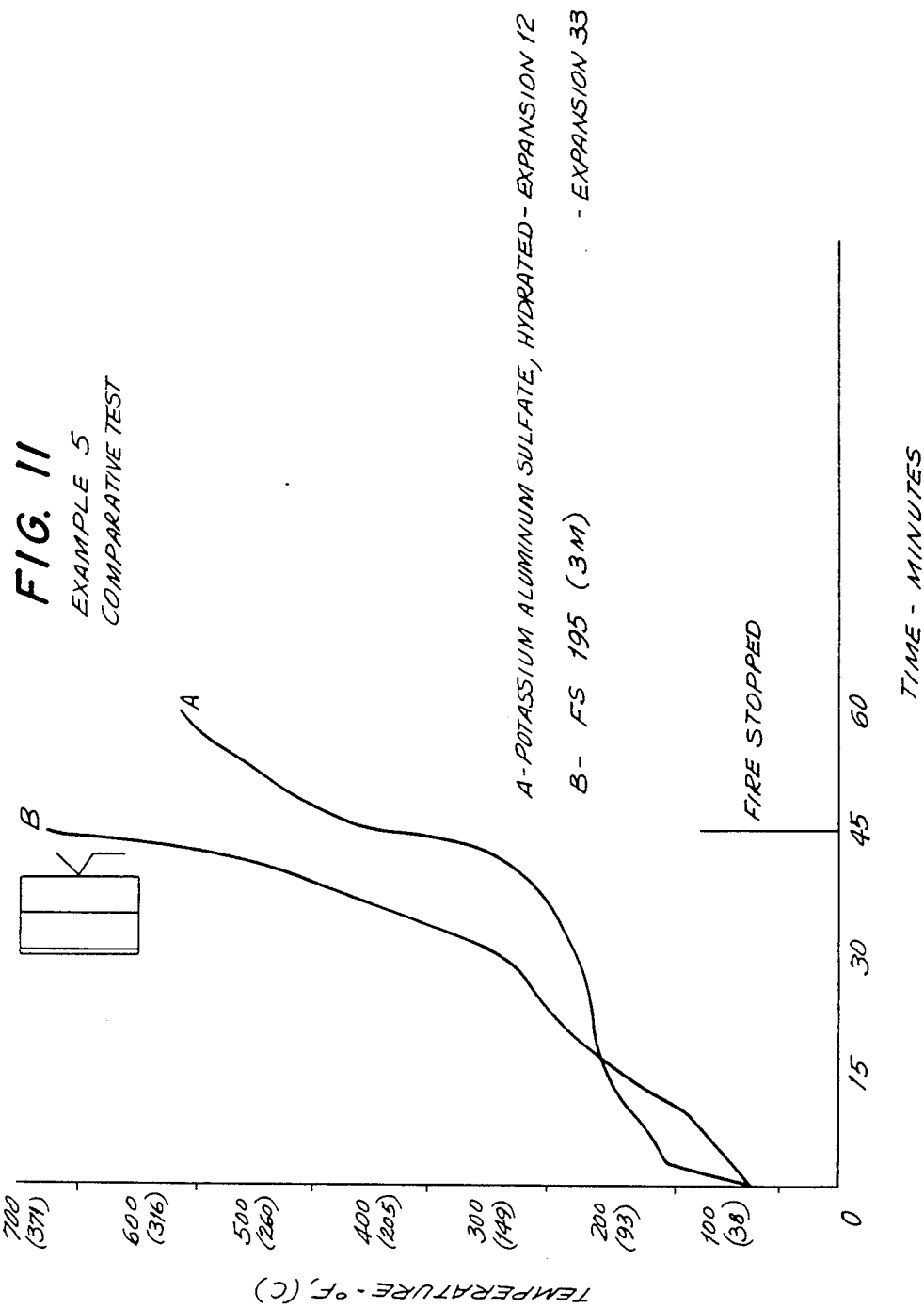

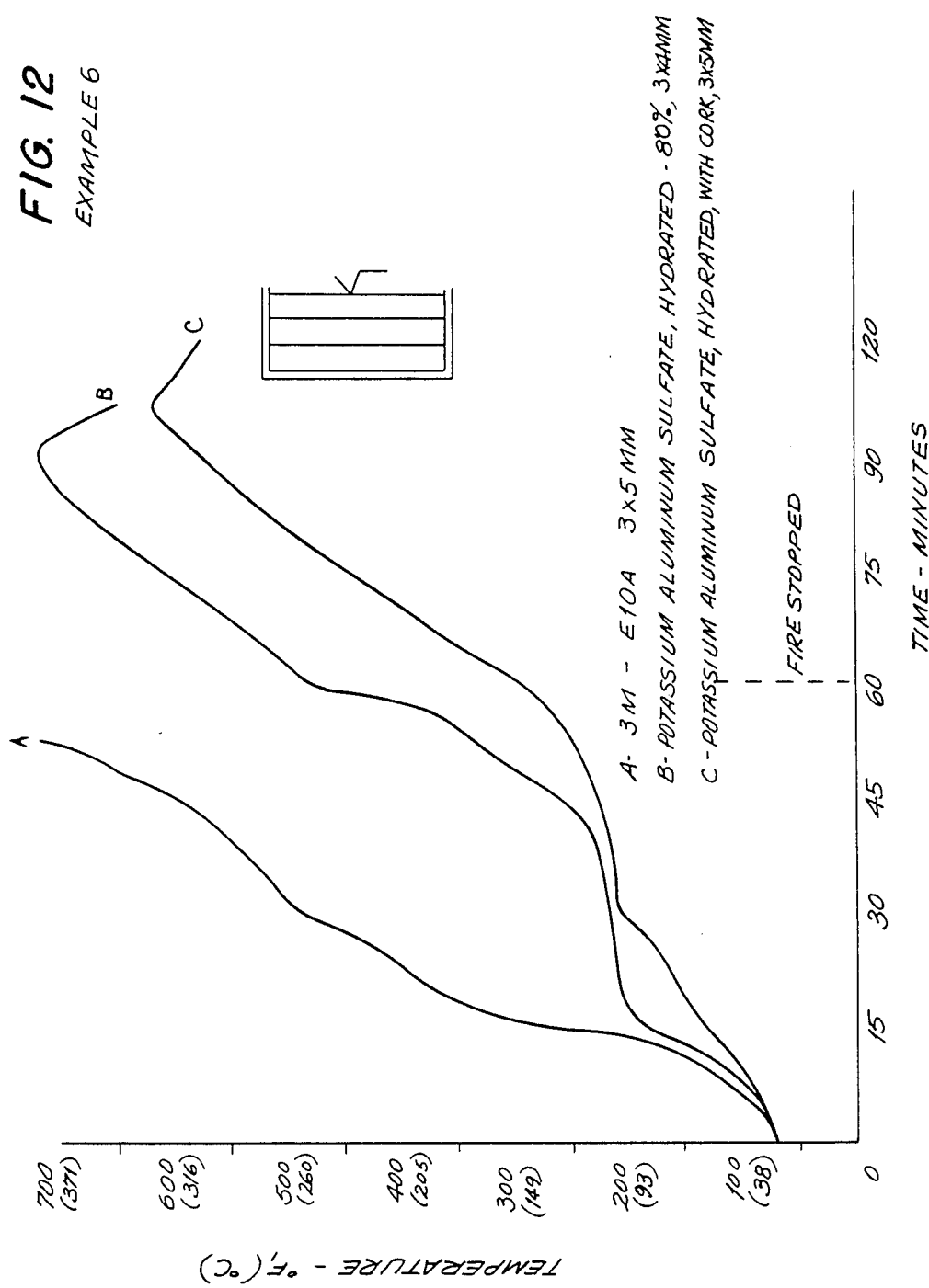

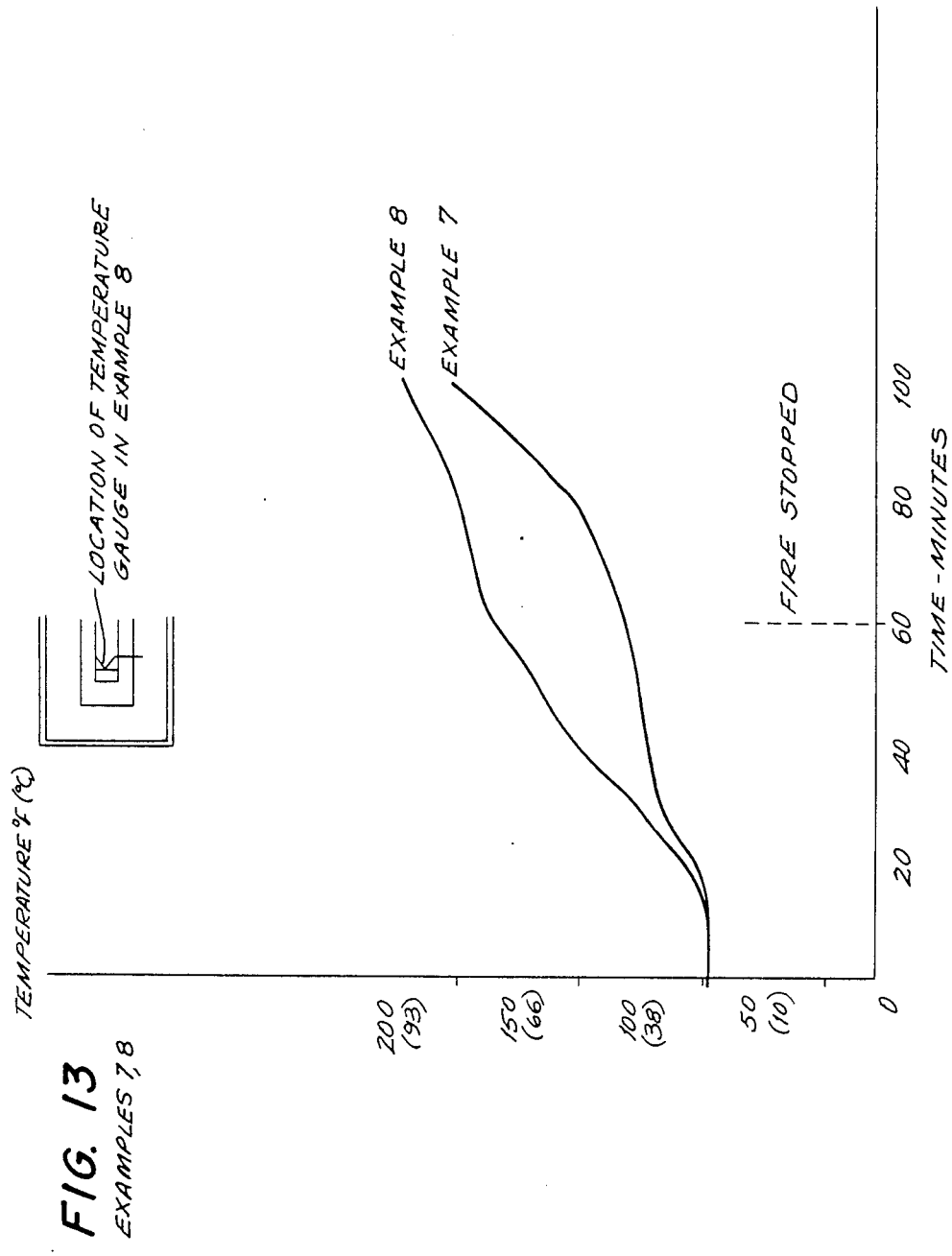

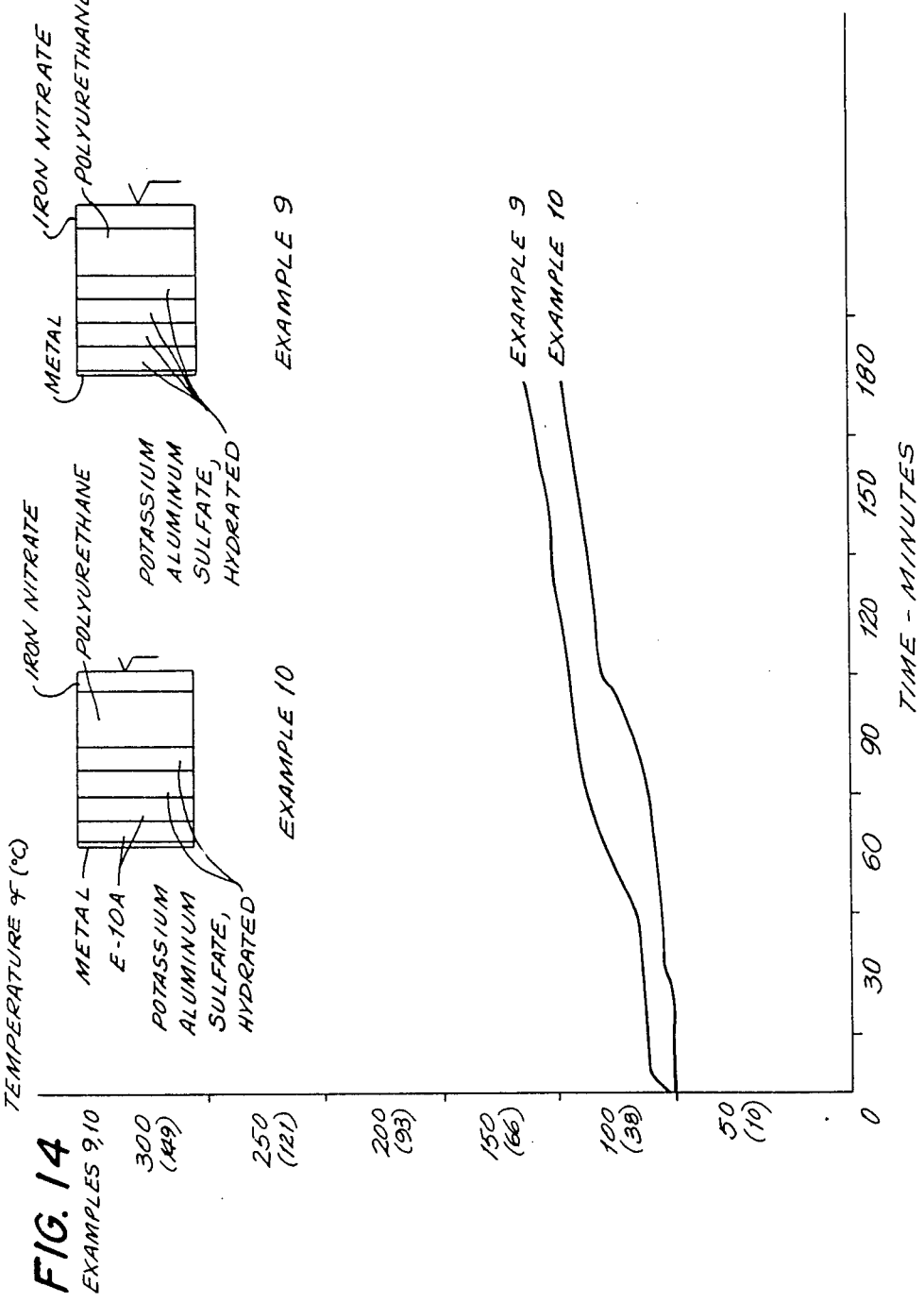

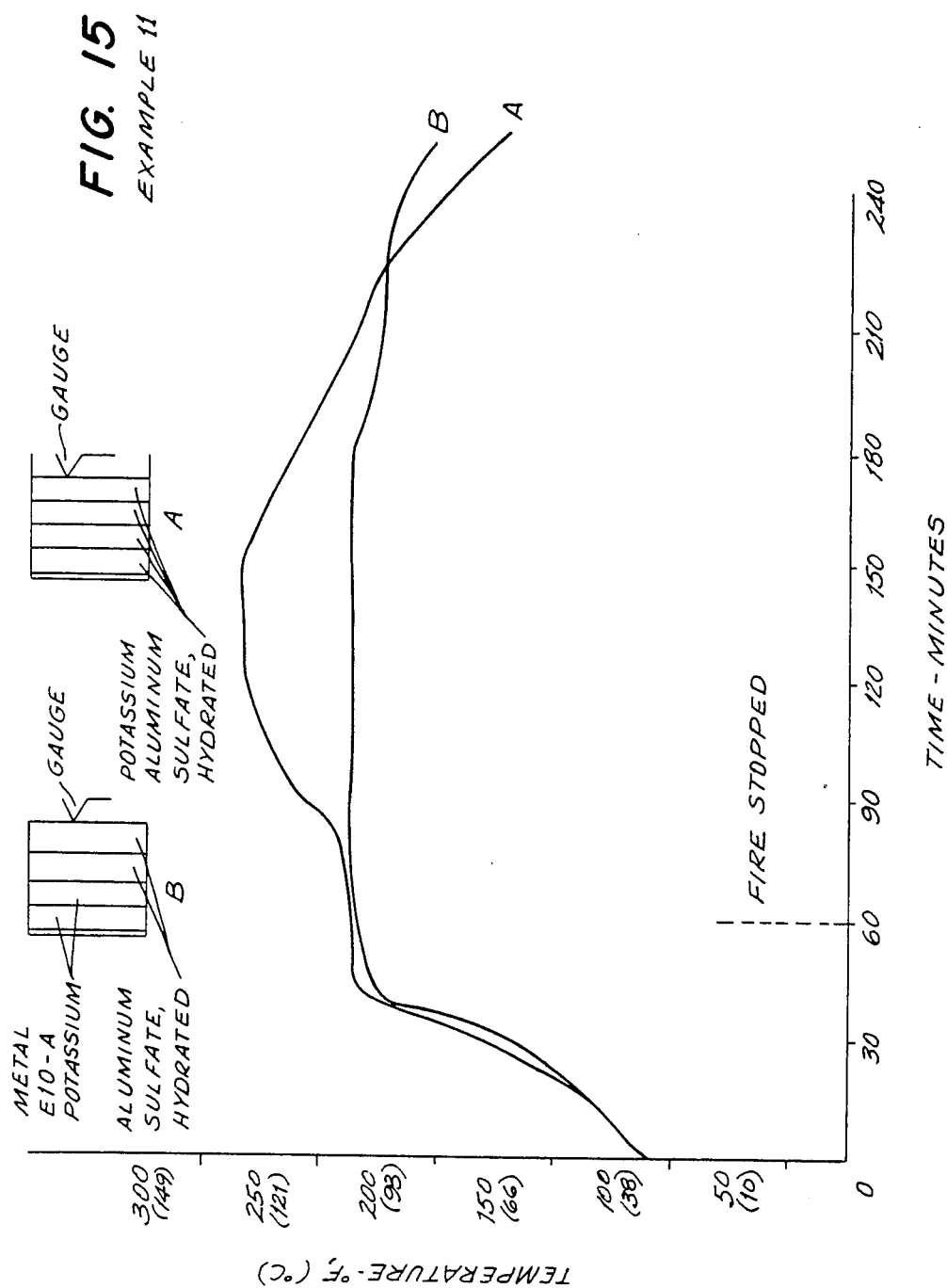

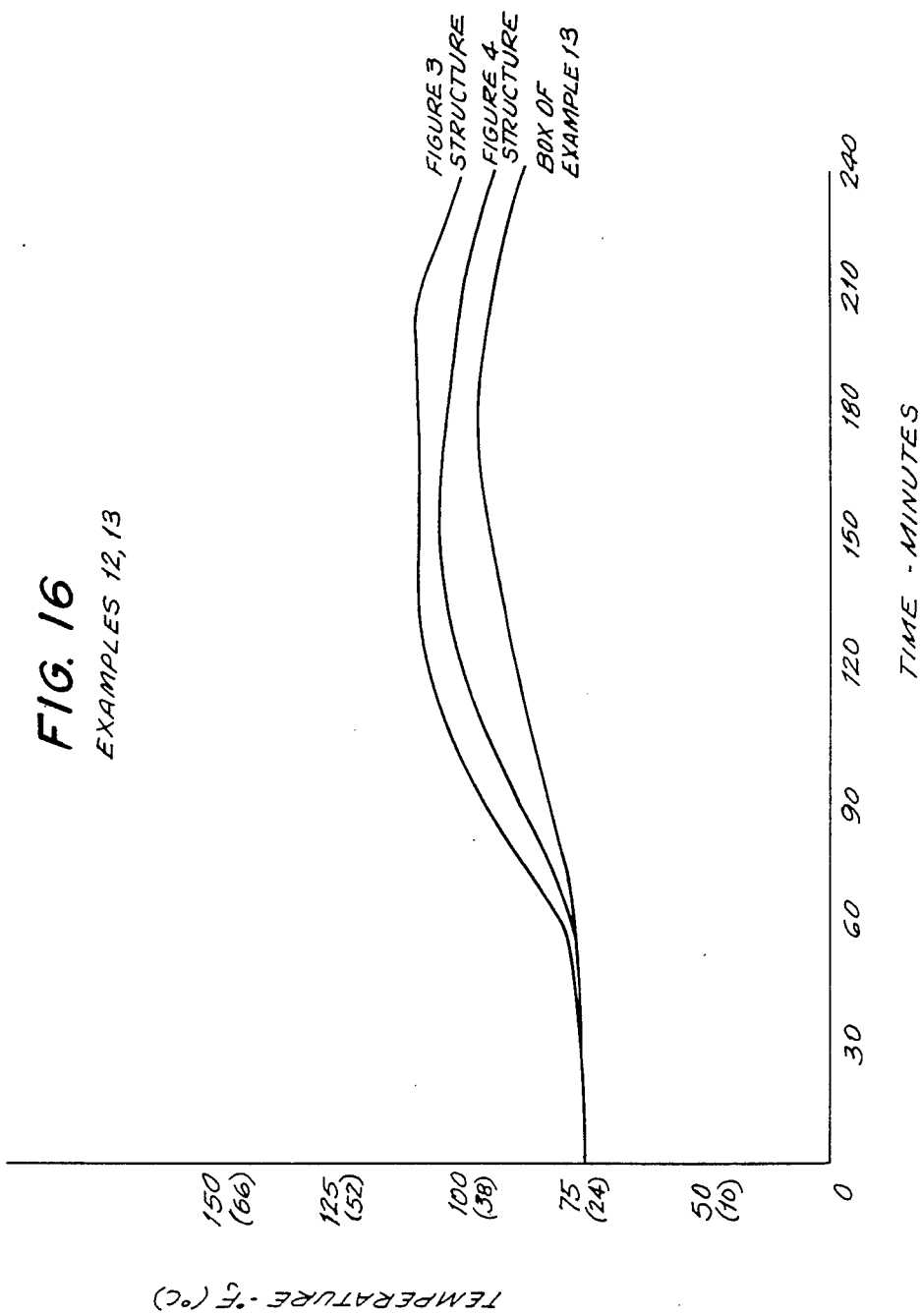

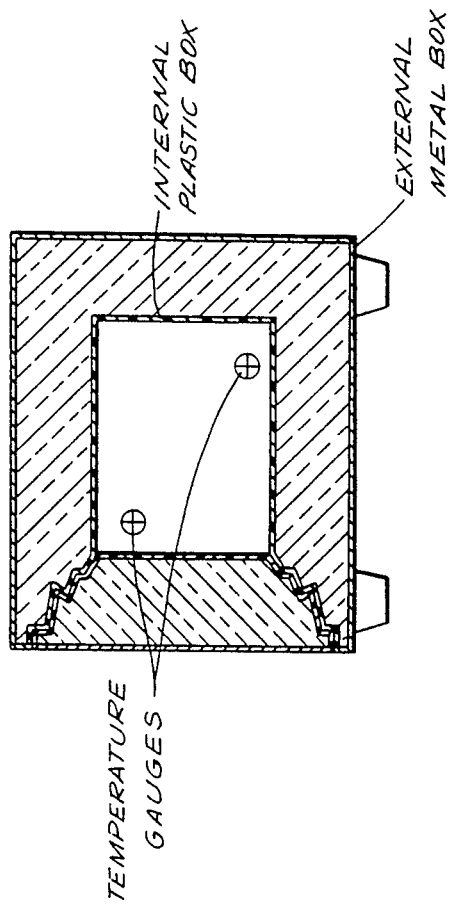

MULTI-LAYER INTUMESCENT-ABLATOR ENDOTHERMIC FIRE RETARDANT COMPOSITIONS

BACKGROUND OF THE INVENTION

The present invention relates to an intumescent-ablator which is prepared in the form of multi-layers for fire retardant purposes.

Ablation is a process where, through a combination of thermal, chemical and mechanical degradation, a substance dissipates energy with an attendant loss of surface material. High temperature heat ablative structures have assumed considerable importance in the development, for example, of high speed aircraft and space vehicles, these objects undergoing severe high temperature conditions during re-entry into the earth's atmosphere. Intumescent compositions generally combine an intumescent agent with a suitable polymeric binder.

Such a composition, when heated to the temperature at which the agent intumesces, results in the composition expanding many times its original volume, forming a charred layer which provides a protective barrier from flame and heat.

Among conventional intumescent compositions are those containing phosphate derivatives that form an acid which reacts with the carbon in the organic binders. Others are nitroaromatic acids. Usually the compositions contain a polymeric binder having a lower melting temperature and which allows the intumescent agents to release gases at the decomposition temperature.

With the advent of the space age, a great deal of research was directed toward the formulation of ablative materials which would be useful in rocket propulsion and re-entry systems. Most of the research was directed towards intumescent-ablator coatings or the like which were designed for a short high temperature pulse of up to 250 seconds in length.

The present invention focuses on the use of a multi-layer intumescent-ablator for fire resistant purposes for a duration of time up to 30 minutes and more and which is useful for protecting various media objects and others, such as computer disks and diskettes, microfilms, photographic films, papers, etc. These materials, used for the purpose of fire assimilation, are exposed to heat according to a standard time-temperature curve known as ASTM E-119 and the cold face temperature is measured over time.

The development of the present invention takes into consideration various parameters involved in the intumescent-ablative reaction. The following parameters were considered, namely, conductivity of the material before being exposed to heat according to the standard time-temperature curve, the heat capacity and latent heat of the ablative material before being exposed to heat according to the standard time-temperature curve, the heat capacity and latent heat of the ablative material, the gas divergation factor, and change of boundary conditions versus time through the intumescence (FIG. 5). The assimilation is a progressing front which creates the combined reaction of intumescence and ablation where, through the process in the front area, the materials go through decomposition which, in some cases, results in structure transformation and phase change of water into vapor and gas released in the front area. Residues after the reaction takes place (or after the heat front has passed) are heat refractory materials. The important factors involved in this invention are as follows:

The time required for the front to reach a certain point will highly depend on the thickness as a power of 2 and, as a power of 1, the parameters of the material itself, i.e., latent heat, heat capacity and transformation energy.

Several techniques have been developed in the past for ablation of intumescence, each dealing with these phenomena separately. Few techniques have incorporated the intumescence with the endothermic reaction.

Hansen, et al., in U.S. Pat. No. 4,122,059, and Raevsky, et al. in U.S. Pat. No. 4,462,831, each stress the use of the ablative reaction only with different ablative materials where a single layer of hydrated iron oxide or hydrated aluminum sulfate was used with an organic or inorganic binder. Raevsky, et al., stressed the importance of a percentage of inorganic salt in the composition as a major parameter for protection time whereas an objective of this invention is to show that other parameters such as layer thickness and expansion play a more important role.

Langer, et al., in U.S. Pat. No. 4,273,879 stress the usage of a flexible heat expanding material comprising an intumescent component in granular form, and an organic binder material.

Swawko, et al., in U.S. Pat. No. 4,088,806, refer to the combination of an intumescent-ablator which is used for coating purposes mostly for short heat pulses.

SUMMARY OF THE INVENTION

Accordingly, an objective of the present invention is to provide an intumescent-ablative endothermic multi-layer composition that would combine the two phenomena, noted above, in order to maximize heat resistance.

Briefly, it was found that the incorporation of a strong ablator containing hydrated inorganic salts, combined with an intumescence agent provides better heat insulation properties than either of the systems by itself.

It is also an object, amongst other objects, to show that the use of a multi-layer system where there is a downtrend in the decomposition temperature, i.e., where the external layer has the higher decomposition temperature as compared with the inner layers, presents better heat insulation properties than a single layer having a single ablative material of the same thickness as that of the previously mentioned, combined, two or more layers taken together.

It is also an object of this invention to use a multi-layer structure in order to provide various solutions to different problems by changing the arrangement of the layers. In FIG. 4, a solution to the problem of weight reduction is shown by changing the location of one of the layers (layer No. 4) towards the interior of the enclosed form, since the surface area of the interior is smaller. Another possible solution is to increase the thickness of the internal layer or the so-called cold layer in FIG. 3, i.e., layer 6, the one with the lowest temperature, in order to avoid conduction of the heat which is retained by the external layer after the fire is turned off.

It has been found that, differently from conventional non-reactive insulating materials, where there is a certain time base which is represented by the exponential temperature decrease versus time, depending on the heat capacity of the material when the material cools down, ablative materials, as expected, tend to hold the temperature at the level of the boiling temperature and higher, for a long period of time which, for the purpose of this discussion is called the plateau length, as shown in FIG. 6. The definition of the plateau length is the amount of time that the cold face of the single layer holds the temperature within the decomposition temperature range when the layer is exposed to heat according to the standard time-temperature curve, previously noted, and after the fire. As seen in FIG. 6, if the fire is stopped after point 1 is reached and the layer is still exposed to heat, the temperature will pick up rapidly (curve A) and then cool down.

In order to prevent the temperature in the interior from rising above the desired temperature which is controlled by the melting temperature of the cold layer (see internal layer No. 6, in FIG. 4), various thicknesses of cold layers could be used, depending on the time exposures to heat and the arrangements of the layers.

It is also an object of this invention to stress the use of cork as an ablative material, it being combined with an elastomeric binder through a conventional rubber production process.

A lot of prior art effort was put into the development of a superlight ablator for spacecraft applications, where the ablator is comprised of low density constituents such as cork, fused silica, phenolic microballoons, etc. The difficulty encountered, however, was to create a high ratio of volumetric filler to resin, since there was not enough resin to wet the filler particles, thus resulting in crumbly low strength materials.

Various unconventional techniques such as mixing with a low sheer mixer or curing under a net pressure of less than one atmosphere are described in U.S. Pat. No. 4,031,059 (to Strauss). It was found that a conventional process of rubber production which incorporated cork was based on the fact that cork had a strong "mechanical memory" which permits an increase in the filler to binder ratio. The above patent reaches a ratio of from 2 to 1 to 3 to 1. However, the present invention reaches a ratio of 5 to 1 when using cork as a major ablator, with an inorganic salt as found in the present invention, and the enhanced capacity is a good means for controlling the density through a relatively simple process. The heat insulation characteristics are thus maintained or improved.

It is also a purpose of this invention to create a superior sealing effect in enclosed form applications such as safes, cabinets, and the like where the ablative-intumescent composition creates a sealing effect in the space between the door and the frame in metal and plastic structures.

U.S. Pat. No. 4,084,926 to Brush, Jr., et al. describes the insulation properties of charred plastic. It was found that the insulation properties of the charred plastic are inferior to the insulating properties of the residual materials (after combustion) of the described material and usually the plastic char is less stable and undergoes compression when positioned between two layers of ablative intumescent materials, due to high compression forces exerted from both sides, thus resulting in an almost homogeneous char when the inorganic ablator and the residues play a major role in heat protection, rather than the charred plastic.

It is an object of this invention to use folded metal mesh or woven ceramic cloth behind an external plastic layer as a structural means to keep the shape of the structure and to enable free expansion, thus improving the heat insulating properties as shown in FIG. 4, layer 7.

It is also an object of this invention to use each of the described materials with a type of binder that will enhance a flexible mat to be used as an insulation mat to cover walls or complex curved structures. If foam is used as one of the layers, it will be used in a flexible form. The binder which is used is a synthetic or natural rubber.

It is a purpose of this invention, in cases where weight is an important factor, to provide a thicker layer with the same weight as a thinner comparative layer and thus provide better insulation. The following examples will stress that object. In Example 6, cork was added to create lower density where the amount of inorganic reactive material remained constant but was spread over a greater thickness. The results show better insulation properties when using a thicker cork layer.

BRIEF DESCRIPTION OF THE DRAWINGS

FIG. 7 shows the results of applying heat to a single layer of various materials of the present invention.

FIG. 8 shows the results of applying heat to a multi-layer structure using various materials of the present invention with no expansion permitted.

FIG. 9 shows the results of applying heat to a multi-layer structure using various materials of the present invention to determine the influence of expansion.

FIG. 10 shows the results of applying heat to a multi-layer structure using various inorganic salts of the present invention plus sodium silicate.

FIG. 11 shows the results of a comparison between a material of the present invention (potassium aluminum sulfate, hydrated) and a commercially available heat insulating material (Interream FS-195 ®).

FIG. 12 compares a commercially available heat insulating material (E-10A ® by 3M) with potassium aluminum sulfate, hydrated (80%) and a material where the potassium aluminum sulfate, hydrated is present in an amount of 50%, and cork, to decrease the density of the composition.

FIG. 13 shows a time-temperature comparison of materials as found in Examples 7 and 8.

FIG. 14 shows a time-temperature comparison between materials as found in Examples 9 and 10.

FIG. 15 shows a time-temperature comparison between two multi-layered structures, as found in Example 11.

FIG. 16 shows a time-temperature comparison of the structures of FIG. 3 and 4 as noted in Example 12 and also of the box of Example 13.

FIG. 17 shows the structure and gauge placement of the box tested in Example 13.

DETAILED DESCRIPTION OF THE INVENTION

Figure 1:
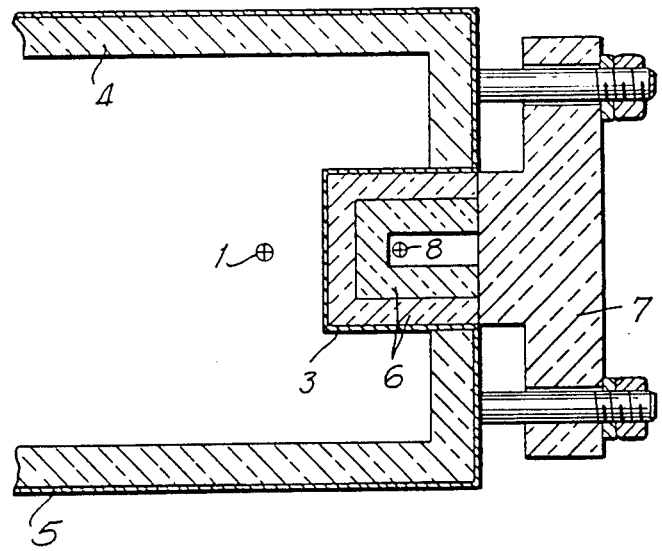
FIG. 1 shows the heat insulation testing facility used in the present invention.

In order to protect various materials such as documents, magnetic diskettes, etc., various ranges of temperatures are required where the enclosure or the wall is exposed to a standard time-temperature curve rate of heating. Two basic methods are used in order to test heat protection capabilities of these materials, each based on a different approach.

1. The material is heated following the ASTM E-119 time-temperature curve while the temperature of the cold face is measured and then, after the fire is stopped, the material is left in the kiln. While the kiln is cooling, the temperature measurement continues until the cold face shows a significant drop in temperature.

2. The enclosure box or cabinet is exposed to heat according to the standard time-temperature curve and the cold face temperature is measured. At a certain time, the box is taken out of the kiln, and water is sprayed on it to cool it off. The enclosure is forced open and damage of the contents and penetration of any sprayed water is checked.

Each of the approaches represents a different scenario of fire: one, when the fire dies off by itself and, in the other, the fire is extinguished by water. Each of the approaches require different solutions, as far as fire protection is concerned, since each of the scenarios presents a different problem. The first scenario is more severe among ablative materials since the high heat capacity and the absorbed heat capacity from the endothermic reaction is retained.

The second approach presents a mechanical problem regarding the structure of the enclosure, that is, no space must be created in the jamb area through the heating process which would allow sprayed water to penetrate into the interior space. This presents a problem in selecting the proper expansion based materials or in the structure of the frame, or both. Nevertheless, the concerns of heat insulation in both cases is the same even though each of them requires different solutions.

Effective heat protection for a one-time usage could be achieved by a material that undergoes a strong endothermic reaction where the residue is a good insulator. The heat which penetrates through the insulator is consumed by the endothermic reaction occurring in the front area. Therefore, the temperature behind the front area on the cold side remains constant until the isotherm reaches the cold side and the temperature peaks up rapidly.

The overview objective of this invention is to provide a system which would allow for rapid heat dissipation by means of:

(a) a strong endothermic reaction
(b) vaporization of water existing in the form of water hydration, and,
(c) in which the residue reaction is a low conductivity heat insulator with an increased thickness (expansion), or combinations thereof.

More specifically, layers of the materials of the present invention can be arranged in a specific order so that the heat dissipation can be maximized for a range of from 50° C. (the objective cold face temperature, or the maximum allowable interior temperature) to about 975° C.

Factors to be considered in selecting appropriate endothermic materials are heat capacity, heat of dissociation of hydration, and heat of vaporization of water of hydration.

The assumption is that the fusion of the anhydrous resultant material takes place at a much higher temperature as compared with the temperatures which are involved in the present invention. In any event, this heat of fusion would affect the invention minimally.

Each endothermic material used in the present invention has a different temperature range for the varius modes, described above, of energy dissipation.

Taking into consideration that the external layer is subjected to a higher temperature than the internal layers, the choice of the endothermic materials for each of the layers of the present invention can then be made, by applying the appropriate maximum energy dissipation characteristics (noted above) to the respective layers according to the particular temperature range to which these layers are exposed.

Temperature ranges are considered in the above choice of layers are as follows:
  500° to 900° C.-vaporization of the residual water of hydration and fusion of anhydrous salt portion;
  about 100° C.-material choice would be one which has a higher percentage of water of hydration which would boil at about this temperature;
  about 50° C.-the material choice would be one having a higher degree of energy of dissociation of water hydration.

DETAILED DESCRIPTION OF THE DRAWINGS

FIG. 1 shows a heat insulation test facility where the kiln is constructed of ceramic fiber mat (4) covering a metal structure (5) from the inside. The heat source is a propane burner (not shown) and the kiln temperature is measured using a chromel-alumel gauge (1). The materials the insulation properties of which are tested (6) are inserted into a metal box (3) which has 5 of its sides covered with said insulating materials to simulate an enclosed form. The side which is left open is the cold face, the temperature of which is measured with a chromel-alumel gauge (8). The materials to be tested are forced to maintain their position by means of a ceramic board (7).

Figure 2:
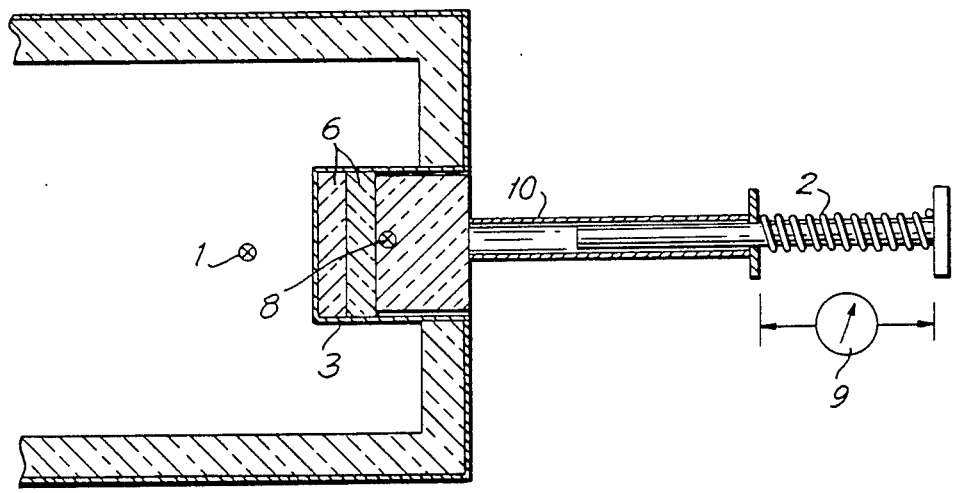
FIG. 2 shows the heat insulation testing facility with an expansion gauge.

FIG. 2 is essentially of the same structure as shown in FIG. 1 except for expansion gauge (9). The expansion of the materials to be tested is done against a spring loaded piston (2) with the spring having a low constant compression of 1.875 g/mm. The displacement of the external pipe (10) which is due to the expansion of the tested materials (6) is measured by the expansion gauge (9).

Figure 3:
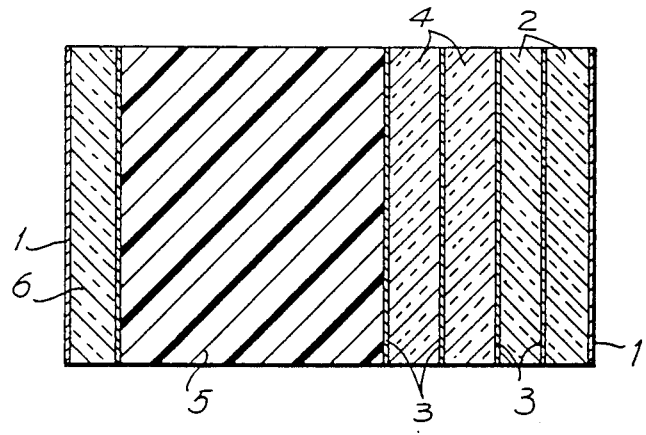
FIG. 3 shows a typical arrangement of layers of a multi-layer structure of the present invention.

FIG. 3 shows a typical arrangement of a multi-layer structure where layers 2 and 4 are the outer layers and are arranged to enhance maximum heat absorption at a temperature range of 150°–950° C. The face between the layers is covered with an aluminum foil of 0.05 mm thickness (3).

The central layer 5 is a foam of either polyurethane or phenolic resin.

Layer 6 is the cold face layer designed to create a "filtering" effect where the temperature of fusion of dehydration of the inorganic substituent is that of the maximum allowed cold face temperature in the interior of the enclosure.

Figure 4:
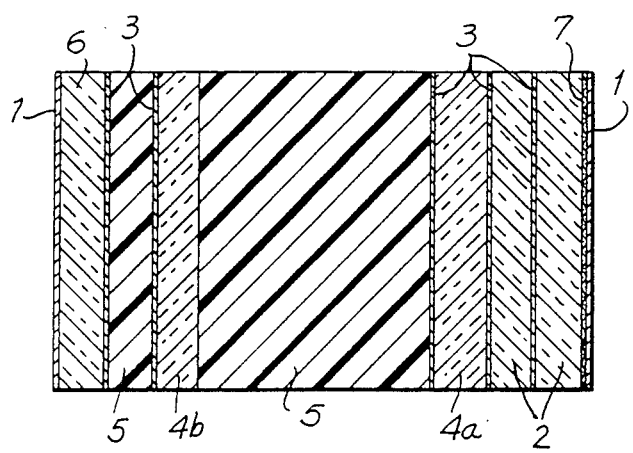
FIG. 4 shows another arrangement of the layers of a multi-layer structure of the present invention.

FIG. 4 shows a different arrangement of the layers where layer 4b was moved toward the inside face. This was done for two reasons, namely, (I), to create a subsystem to prevent heat flow toward the inside after the fire was stopped, which is due to heat which was retained in layers 2 and 4a, and, (II), for weight reduction purposes where layer 4b, now being more toward the inside of the enclosure thus covering a smaller surface area with the same thickness, resulting in less weight than the arrangement of layers in FIG. 3.

Figure 5:
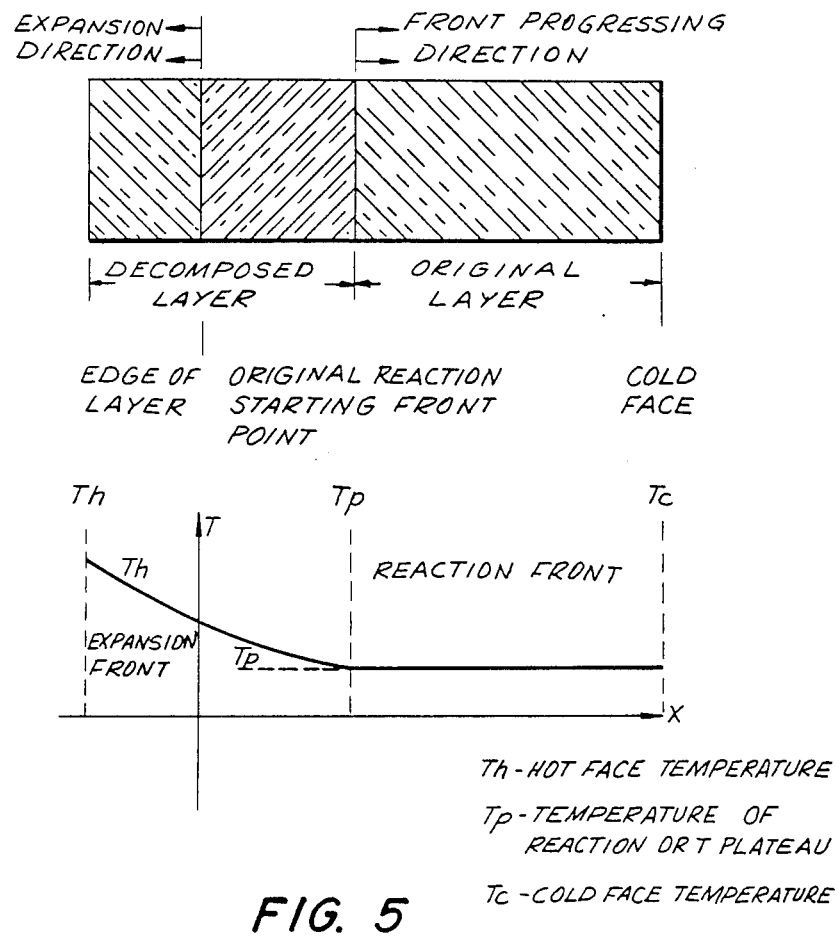
FIG. 5 shows the assumptions, both in structure and in isothermal terms of heat as applied to a single layer, wherein the reaction front isotherm moves toward the positive direction of the abscissa (x-axis).

FIG. 5 presents the basic assumptions involved in the structure of the multi-layer materials. This representation in a graphic mode is for a single layer system.

The expansion front moves towards the negative direction along the abscissa. The purpose of the model is to find a functional correlation between the parameters taking part in the process, i.e., layer thickness, time of exposure to heat according to the standard time-temperature curve, and the physical constants of the material such as heat capacity, heat of fusion, heat of dehydration, and the like.

Figure 6:
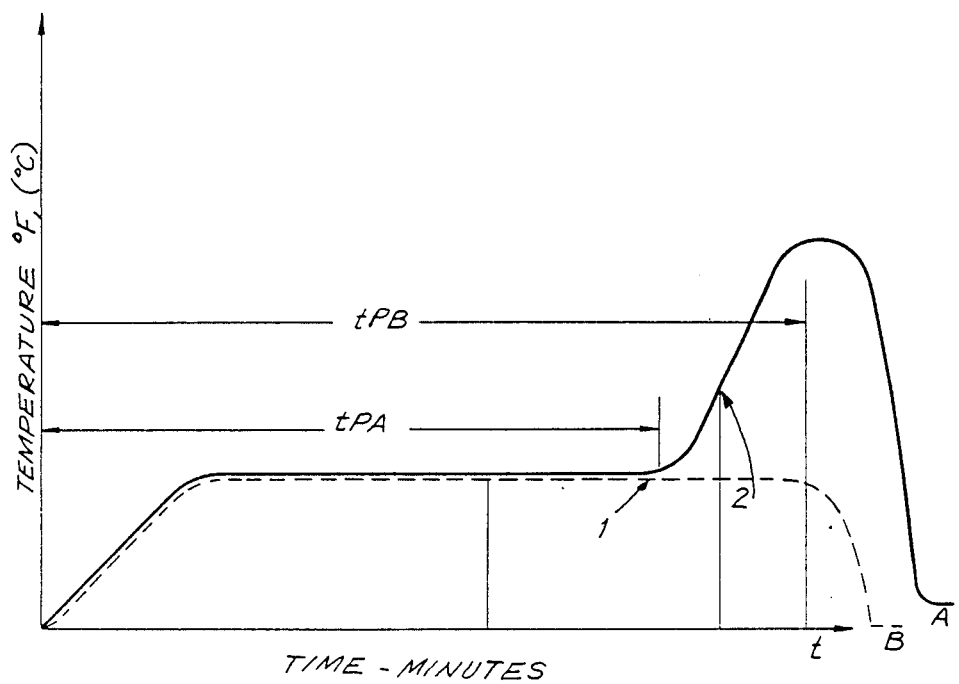
FIG. 6 represents a typical curve for a single layer of the compounds of the present invention when exposed to heat according to the standard time-temperature curve.

FIG. 6 represents a typical curve for a single layer of compounds of the present invention wherein they are exposed to heat according to the standard time-temperature curve. Two cases are represented: Curve A, where the entire inorganic compound was consumed through the heating process and therefore the temperature picked up after the fire was stopped; and Curve B, where the material was not consumed via the heat exposure and the residue of the inorganic compound was sufficient to maintain the temperature at the plateau level.

The plateau length (or time) as shown for Curves A and B is represented by $tp_A$ and $tp_B$, respectively, and is the time from start-up until the temperature pick-up or a significant drop in temperature occurs. The plateau is described by Tp.

FIG. 7 shows the results of applying heat according to the standard time-temperature curve to a single layer material of the present invention, namely, (A) aluminum sulfate, hydrated, (B) aluminum ammonium sulfate, hydrated, and (C) potassium aluminum sulfate, hydrated. Curve D represents the kiln temperature. FIG. 7 is further described in Example 1.

FIG. 8 shows the results of applying heat, according to the standard time-temperature curve, to a multi-layer structure (4 layers, each 4 mm thick) of the present invention with no expansion permitted, said materials being (A) aluminum sulfate, hydrated, (B) potassium aluminum sulfate, hydrated, and (C) aluminum ammonium sulfated, hydrated. FIG. 8 is further described in Example 3.

FIG. 9 utilizes the same materials shown in FIG. 8 with the exception that the influence of expansion of these materials was determined. FIG. 9 is further discussed in Example 4.

FIG. 10 shows the results of applying heat according to the standard time-temperature curve to a multi-layer structure using (A) potassium aluminum sulfate, hydrated, (B) aluminum sulfate, hydrated and (C) aluminum sulfated, hydrated together with sodium silicate, to determine the effect on insulation by expansion. FIG. 10 is discussed in Example 5.

FIG. 11 shows a comparison between layers of (A) potassium aluminum sulfate, hydrated, and a commercially available insulating material (B) Interearn FS-195 ®. This figure is further discussed in Example 5.

FIG. 12 compares (A) a commercially available heat insulation material (E-10A ®, by 3M), B) potassium aluminum sulfate, hydrated, 80%, and (C) 50% potassium aluminum sulfate, hydrated, and cork. This shows the effect of decreasing the density of the composition on heat insulating properties as well as comparing the materials of the present invention to a known heat insulating material.

FIG. 13 shows the results of comparing a material containing potassium aluminum sulfate, hydrated, cement and water as found in Example 7, against the same salt, polyester and fused silica as found in Example 8.

FIG. 14 shows a comparison between a multi-layered structure of the present invention and a multi-layers structure wherein some of the layers include a commercial heat insulation material. FIG. 14 is further described in Examples 9 and 10.

FIG. 15 shows a comparison between structures having different layers of materials based on decreasing melting temperature versus materials having layers of the same melting temperature, each structure having the same thickness. FIG. 15 is described in Example 11.

FIG. 16 shows a comparison of the structures of FIGS. 3 and 4 as noted in Example 12 as concerns the arrangement of layers, versus the box of Example 13.

FIG. 17 shows the structure of the insulated box tested in Example 13 and placement of the temperature gauges therein. The box in FIG. 17 has an external metal structure and an internal plastic box made of polyester resin reinforced with glass fibers or of high density polyethylene.

The space between the external metal and the internal plastic box was filled with the compositions of the present invention. The four temperature gauges inside the box were placed 50 mm from each corner and the temperatures were measured by the gauges while the box (safe) was exposed to heat according to the standard time-temperature curve.

A description of a single layer system is given in FIG. 5. An isotherm is described as a progressing reaction front which approaches the cold face as a function of time and is characterized by the fact that it represents the temperature of the front, Tp. The decomposed layer, which is shown in FIG. 5 as being on the left of the front and which may also be described as the area through which the front already passed, is characterized by the fact that it is a porous alumina- or silica-based char with lower heat conductivity characteristics. Alumina or silica is the residue of the dehydration reaction, respectively, and is essentially the anhydrous portion of the starting hydrated salt. The porous structure is created by vaporization of water of hydration and release of gases when the charring of the organic binder takes place. In certain instances, described below, foaming materials (blowing agents) which release gas are incorporated into the structure and they contribute to the expansion process by releasing volumetric gases which are contained in their encapsulating cells.

In addition to the energy quotient described above regarding the energy dissipation of each stage, the energy dissipation of a blowing agent which is used in the present invention should be taken into consideration. The blowing agents used in the present invention are in the Celogen ® family (azo and hydrazide compounds, products of Uniroyal) and represent an energy of decomposition of 250–350 calories per gram.

In FIG. 5, the abcissa represents the dislocation or movement of the isotherm in the positive x-direction and the movement of the expanded surface proceeds toward the negative x-direction. At point $x=0$, time, (t), equals 0, and temperature, (T), equals 25° C., i.e., starting conditions of the heating process. In FIG. 5, the ordinate is the temperature range of the system.

As shown in FIG. 5, the temperature proceeds parabolically downwards toward the point of the isotherm portion where it stabilizes at a relatively constant level and then proceeds in a further downward direction the greater distance from the zero point, i.e., x in the positive direction.

These factors are valid as concerns a similar material, whereas in multi-layer multi-materials and expansion, the case is much more complex because it involves moving boundaries toward the negative direction of the x-axis, a shown in FIG. 5, as a function of the time while exposed to heat and, further, it involves different levels of temperature, depending on the melting points and the conductivity of each layer by itself, and the interrelationships with the other layers which are present.

Since an object of this invention is to provide protection for materials such as papers, magnetic diskettes and the like, for certain periods of time, for practical purposes, two main objectives of cold faces temperatures were chosen that is, about 52° C. and 177° C. The complexity involved in the lower temperature level is much greater. Therefore, the focus will be at the 52° C. level while the 177° C. level is a secondary consideration.

The multi-layer structure or arrangement presented in this invention is described in FIGS. 3 and 4, and consists of two layers of hydrated inorganic salts containing a high percentage of sublimated water molecules (water of hydration). The external layers are arranged, preferably in a form where the external layer will have a higher degree of decomposition or higher melting temperature. The internal layer, No. 6, closest to the cold face, contains salt which has a melting point or dissociation temperature with the desired objective temperature or lower.

The configuration described in FIG. 4, is designed for the first scenario of testing where problems of heat retention are raised. Since it was determined that the optimum heat protection will be achieved if the thickness of layer No. 6 was equal to the attached layer of foam (such as polyurethane), layer No. 5, the structure of internal layers 6, 5 and 4b of FIG. 4, serve as a subsystem to provide heat protection for heat retained by the kiln and by the external layers 2 and 4a (on the other side of FIG. 4) after the fire has stopped.

The testing occurred in two stages:
1. Testing of external layers
2. Testing of combined multi-layer structures.

The configuration shown in FIG. 4 is the general solution for combined multi-layer structures.

STAGE 1

For high temperature reactors, 4 types of inorganic salts which have melting temperatures of around 100° C. and a high percentage of water molecules (water of hydration) were tested, i.e., $Al_2SO_4.16-18H_2O$, $AlNH_4(SO_4)_2.24H_2O$, $KAl(SO_4)_2.12H_2O$, and $MgSO_4.7H_2O$.

Each of the materials was tested with different binders, organic and inorganic, to find the best binder for the first stage.

EXAMPLE 1

Aluminum ammonium sulfate with 24 waters of hydration, $AlNH_4(SO_4)_2.24H_2O$, was mixed with refractory cement according to the following volumetric ratio; 50% refractory cement and water (equal parts), and 50p% aluminum ammonium sulfate (hydrated).

The compounds were mixed with a hand mixer, molded into five sides of a cubic box, such as shown in FIG. 1, cured, and tested after 72 hours. The thickness of the material was 25 mm. The box was exposed to heat according to the standard time-temperature fire curve conditions for 30 minutes after which the fire was stopped. The results are shown in FIG. 7. The results show that Compound B, $AlNH_4(SO_4)_2.24H_2O$, reached the temperature of 121° C. at the end of 30 minutes exposure. After 15 minutes at that temperature, the temperature peaked up and reached a temperature of 177° C., 15 minutes later. It should be noted that after the fire was stopped, the kiln cooling rate was faster than the cooling rate of Compound B.

Therefore, FIG. 7 shows graphically the heat retention of Compound B is greater than the heat retained by the kiln. As shown in FIG. 1, the kiln is constructed from ceramic fiber insulation that cools down at a faster rate than Compound B. This test thus shows one of the advantages of using a material such as Compound B as a good insulating material. Nevertheless, the heat retention capacity of Compound B is somewhat disadvantageous in that it is not easily dissipated. This problem will be discussed further, below.

EXAMPLE 2

The test was repeated using the same procedure as Example 1 for hydrated aluminum sulfate, hydrated potassium aluminum sulfate and Epsom salt ($MgSO_4.7H_2O$). The results are shown in FIG. 7. The Epsom salt results were close to that of the aluminum ammonium sulfate salts. As will be seen in the following example, the relatively short plateau length for these materials is due to the low content of inorganic salt as a result of the relatively low absorption capacity of the refractory material used as a binder.

EXAMPLE 3

Each of the inorganic salts out of the 4 noted above was mixed with a neoprene binder under the following procedure:

To a milled neoprene was gradually added the inorganic salts in powder form, paraffin and plasticizers were added and mixed according to the following composition:

| Ingredient | parts by weight |
| --- | --- |
| Neoprene whv ® (Dupont) | 100 |
| Scorch Guard ® | 4 |
| Petrolatum | 2.25 |
| Paraffin | 1.50 |
| Teflon ® | 3.00 |
| Chlorowax ® 40 (a resinous, chlorinated paraffin) | 50.00 |
| Inorganic hydrated sulfate salt | 600. |

The additional paraffins were added in order to increase the absorption capacity of the neoprene and to facilitate the processing. The choice of binder ran between natural rubber, neoprene and silicone rubber, each of them representing a different melting point, density and absorption capacity of powder, to wit,

| Ingredient | Density (g/cc) | Melting Point, °C. |
| --- | --- | --- |
| Natural rubber | 0.9–0.95 | 100–105 |
| Neoprene | 1.2–1.23 | 150–105 |
| Silicone rubber | 1.15–1.30 | 205–220 |

The melting temperature of the binder is important, since the higher the temperature is, the longer is the period of expansion it will provide when exposed to fire. The neoprene was chosen as a preferred embodiment, primarily as an economical compromise.

The mixing process generates a temperature build-up of the mill of the mixer; therefore, cooling is required to prevent the temperature from reaching the melting point of the inorganic compound, namely, around 90° C.

The composition was made into sheets, in a thickness of 4 mm each, and covered with aluminum foil, 0.05 mm thick, on only one side. The layers were put in a metal box in a manner shown in FIG. 8, four layers, 4 mm each, with the aluminum foil layer facing away from the metal wall.

The metal box was exposed to heat according to the standard time-temperature curve for 60 minutes. The cold side was forced to maintain its position in order to avoid expansion, by means of ceramic board as shown in FIG. 1, since the objective was to find the time-temperature curve of the cold face of each material without expansion, in order to compare these results with those of free expansion.

The results of the time-temperature curves of the rubberized layers are shown in FIG. 8. These results show significantly superior results versus a cement binder used in Example 1. It should also be noted that the cooling rate of the kiln was faster than the cooling of the composition of the protecting layers in FIG. 7. The tp for each curve is the plateau length (see FIG. 8). The aluminum sulfate shows a lower peak level (304° C.) but a shorter tp than the potassium aluminum salt (382° C.) and a higher plateau temperature, 104° C. versus 93° C. The peak temperature of the ammonium aluminum sulfate is 360° C.

The temperature increase after the plateau temperature is due to the fact that the isotherm described in FIG. 5 reached the cold face and the inorganic compound in the layers was exhausted (that is, the water of hydration was mostly evaporated).

EXAMPLE 4

The same materials were prepared as in Example 3 but with a different test procedure and minor compound change. The objective of the test was to check the influence of expansion over the cold face time-temperature curve. The test facility is shown in FIG. 2.

A spring-loaded piston was used in order to create a reference for expansion for comoparison purposes between the various materials. The spring constant, K=1.875 g/mm was relatively low. The reading of the test included the cold face temperature and the movement of the cold face by expansion of the layers while the external metal box was exposed to heat according to the standard time-temperature curve. The samples preparation set forth was similar to the one described in Example 3, except for the fact that a blowing agent manufactured by Uniroyal, known commercially as Celogen.AZ ® i.e., azodicarbonamide, was added to the compound at the ratio of 30 to 100 parts by weight of rubber. The reason for this high proportion relates to the fact that the rubber content is relatively low and therefore rubber content per volumetric unit in the total composition is low. The Celogen.AZ creates a network of non-interconnecting closed cells formed by the entrapment of inert gases as discrete bubbles in the matrix of the rubber of plastic material used as a binder. The blowing system needs to be regulated in order for sufficient gel to be developed to encapsulate nitrogen gas when the decomposition of the Celogen.AZ begins.

In order to assure sufficient expansion even in deeper layers where the temperature has not reached the temperature of the front, a grade of Celogen.AZ was chosen with a relatively finer grain size (approximately 3 u (microns)) and a relatively low temperature of decomposition, i.e., 132° C. The effectiveness of the expansion is the function of the grain size, since larger area and better heat insulation properties will be obtained with a larger grain size because more gas cells with smaller diameter will be created. As shown by the curves in FIG. 9, the results of the free expansion of the insulation layers are much better than the results of the insulation-only type of test of Example 3. That is, an extended plateau length, lower peak temperature after the plateau, and lower plateau temperature are obtained.

It is also shown in FIG. 9 that the results achieved by the use of this composition are better than those obtained by using those compositions of the previous examples because of the better properties of expansion of this composition. It is known that expansion is an important property involved in heat insulation.

The results of this example are highly correlated to the expansion. However, expansion, as the only mechanism, does not explain the results shown in the following examples, namely, other factors are necessary to be included in a good heat insulating material, such as water of hydration content, and heat of fusion of the inorganic salt.

EXAMPLE 5

The same procedure for preparation of materials described in Example 3 with a different formulation was used. The materials and their weight proportions are given below.

| Material | Parts by weight |
| --- | --- |
| Neoprene ® whv | 100 |
| Scorchguard ® | 3 |
| Petrolatum | 12 |
| Paraffin | 6 |
| Teflon ® | 3 |
| Potassium alum, or aluminum sulfate, or aluminum amonium sulfate | 450 |
| Sodium silicate | 150 |

The purpose of this test is to compare two intumescent compositions using two different mechanisms. The first compositions used are based on the intumescence properties represented by sodium or potassium silicate, where the grain size and sodium-to-alkali ratio are kept within a range that will provide intumescence as well as low water solubility. On the other hand, the second compositions used are the ones described in Example 4, where a Celogen.AZ blowing agent was used. The results of the test are shown in FIG. 10 and are inferior to those represented in Example 4. This is due to the low water of hydration content and also due to the low expansion resulting from the fact that the sodium silicate content was fairly low, i.e., about 20% by weight.

A comparative test was conducted to compare a 5.1 mm layer of 3M material known commercially as Interream FS-195 ®, a commercially available heat insulating material, where the sodium silicate content is 40% and more, and the expansion of this material is around three times greater than a composition containing potassium aluminum sulfate mixed with blowing agent with the other constituents, as described in Example 4, above. Referring to FIG. 11, the results obtained show a clear advantage using KAl(SO$_4$)$_2$.hydrated versus Inteream FS-195 even though the expansion ratio of the Inteream FS-195 to the potassium alum is about three times greater. This conclusion can also be demonstrated by the other inorganic sulfate salts used in the present invention.

The Inteream FS-195 represents the case of a material containing a high content of intumescent material in the form of sodium silicate, which provides good expansion but is a poor heat energy absorber. This is due to the fact that the water content of the hydrated sodium silicate is about 18.5% or less, depending on the degree of hydration, whereas the hydrated sulfate salts of the present invention contain between 40 and 64% by weight of water of hydration.

It can therefore be concluded that materials containing a high amount of water of hydration are an important factor in heat insulating materials. Consequently, the use of the Celogen.AZ as a blowing agent in the compositions of the present invention (in an amount of from 2 to 3% by weight) is advantageous, since it does not replace, to any significant degree, the sulfate salts used to supply the high water of hydration required to facilitate a good heat insulating material.

To amplify on the above conclusion that materials containing a high degree of water of hydration are an important factor in good heat insulation; in addition to the water of hydration content factor, the higher the heat of hydration, heat of vaporization and heat of fusion of the sulfate salts, at various temperature ranges, the better the heat insulating properties of the material of the present invention.

This has been shown with regard to the fact that, while AlNH$_4$(SO$_4$)$_2$.24H$_2$O has a 64% water content, it is not as efficient as a heat insulating material as, for example, KAl(SO$_4$)$_2$.12H$_2$O, which has a 46% water content. This is shown in FIG. 9.

EXAMPLE 6

Empiric testing was required to prove certain assumptions regarding thickness and weight. The main question was if the proportional parts of binder remain constant, what is the implication of increased thickness by using a composition which is less dense (a smaller weight to volume ratio) In order to achieve that goal, i.e., reduction of total composition density, a set of mixtures with different volumetric materials were prepared according the procedure set forth in Example 3.

The volumetric materials used were precipitated silica, phenolic micro-balloons, fused silica, ceramic fibers and cork. Each of the volumetric materials was mixed with a rubber compound and inorganic salt to obtain a density of 0.8–1.1 g/cc. The denity of the materials of the previous examples was in the range of 1.3–1.45 g/cc. The reason for this higher density, which is higher than the one described by the manufacturer for the inorganic salt for bulk density, is the fact that the mixed composition is processed through a mill, resulting in higher density through external pressure created by the rubber binder and the compression forces exerted by the mill.

This was also the reason why most of the volumetric materials, when added to the composition, did not decrease the composition density because of the compression they went through. The only material that tended to retain its volumetric properties was cork.

The following composition was prepared:

| Materials | Parts by weight |
| --- | --- |
| Neoprene whv | 100 |
| Scorchguard | 4 |
| Petroleum | 3 |
| Paraffin | 1.3 |
| Teflon | 3 |
| Potassium aluminum sulfate, hydrated | 450 |
| Cork | 150 |

The resultant density of this compound was 1.1 g/cc. The grain sizes of the cork used ran between various densities in the range of 0.05 to 0.07 g/cc. A difficulty regarding the grain size of the corks used relates to the absorption capacity of the binder. The finer the grain size the more difficult the incorporation of cork into the composition in high cork content proportion. Different grain sizes were tested, the preferred one being one having a mesh of 20/40, U.S. Standard Sieve Size, and a density of 4.5 pounds per cubic foot (i.e., 0.07 g/cc). The insulation properties of the composition containing cork were tested compared to the various compositions that had a 70 to 80% amount of inorganic salt without cork. The results show a clear advantage in favor of the cork-containing composition (see FIG. 12). In this test, the weight of the materials used was constant to maintain an equal density ratio of 1.1/1.4 and the thicknesses of the layers was varied. The thickness of the layer of insulating material containing cork was 5 mm as compared to the non-cork material from the previous examples which had a thickness of 4 mm.

The results are extremely important for applications where the weight of the insulating material is a critical factor such as in airborne vehicles (planes, etc.).

The cork composition of the present invention was compared to a commercial ceramic fiber-based material which incorporates inorganic salts manufactured by 3M known commercially as E-10A ® which has a density of 0.87 g/cc. The layers were arranged in the same manner as the cork layers. 3 layers of 5 mm each were compared to 3 layers of 5 mm of the present cork composition.

The results show a clear advantage for the cork composition as evidenced by a lower heat retention peak temperature (FIG. 12).

To summarize, with regard to the high temperature stage (Stage 1), the high temperature layer testing revealed the following results:

1. A range of cold face temperatures could be obtained by chosing different organic salts each of which providing a different plateau temperature level.
2. The thickness of the chosen material for a particular level of temperature is based on the length of time at the plateau temperature for each particular composition.
3. If expansion is a permissible process within the structure of the enclosures, the expansion process takes place as described in the above examples with longer plateau lengths as is described in Example 5.
4. If the weight of the insulating material is a critical factor, a cork based composition with a cork content to create a lower density is advantageous.

STAGE 2

To summarize the second stage, i.e., multi-layer structures, a multi-layer basic configuration is one described in FIG. 3 and the external layer testing (layers 2 and 4) is as described in Examples 1 to 6. The major objectives of stage 2 are:
1. Optimal structure for fire scenario 1, i.e., dealing with a heat retention problem (without spraying).
2. Minimization of weight of the insulating layer.
3. Creating a structure for obtaining a desired interior cold fact temperature.

The layer between layers 4 and 6 in FIG. 3 is a foam, either phenol-formaldehyde or polyurethane. The type of foam depends on the top temperature limitations of the foam, that is, polyurethane is 102°–110° C. and of the phenolic compound, around 149° C. The other types of foams that might be used are the styrofoams of foamed rubber, depending on the temperature required for each application.

The internal layer No. 6, described in either FIG. 3 or 4, is the one that controls the temperature inside the protected face of the structure. The choice of the appropriate material depends on various factors; its melting temperature and dehydration points, heat capacity, latent heat and heat of transformation required for each phase change, and the water of hydration consistency.

Since the required range of temperatures is around 52° C., a number of inorganic salts with high water of hydration content and with a melting point of around 55° C. were tested, as shown in the following table:

| Materials | Density (9 g/cc) | Melting Point, °C. |
|---|---|---|
| $MgCl_2.4H_2O$ | 2.01 | 58 |
| $Fe(NO_3)_3.9H_2O$ | 1.70 | 47.2 |
| $Na_2SO_4.2H_2O$ | 1.60 | 52 |
| $Al(BrO_3)_3.9H_2O$ | 1.2 | 62.3 |
| $Na_2S_2O_3.5H_2O$ | 1.68 | 48 |
| $Na_2S.9H_2O$ | 1.55 | 50 |

DENSITY OF SALTS FOR LOW TEMPERATURE COMPOSITIONS

The screening of the materials was based on their performance and economic feasibility. The following tests were conducted with one of the following materials since their performances were quite close, namely, sodium silicate, iron nitrate or sodium thiosulfate.

Various binders were used for testing purposes; either a resin-based system, polyester or epoxy resin or, from the rubber family, silicone rubber, natural rubber or neoprene. Layer No. 6 of FIG. 3, described in the following examples, was prepared with a resin binding system. During the preparation of the resin binding system, attention was paid to the temperature developed by the resin through the curing process.

Some problems might arise because the melting and the dehydration temperatures of these materials is relatively low and the resin system, while curing, might reach these temperatures through the curing exothermic reaction because of the possibility of phase changes.

Not all the materials will return to the previous phase when cooling takes place after reaching the melting point of the inorganic substance. This could result in a hydrated salt to be separated into an anhydrous salt and its water of hydration.

Therefore, the amounts of hardener and resin, the peak-up of the temperature and the presence of center nuclear points in the reaction mixture should be strictly controlled to ensure total solidification of the composition.

The compositions described in the following examples were prepared by the following process:
1. Resin (80–95% by weight) was completely mixed with a hardener (5–20% by weight) at low speed in a mixer for short periods of time.
2. A powdered inorganic salt of the present invention was poured gradually into the first mixture while measuring the temperature and preventing the temperature from increasing above 50° C.

An alternative method may be used where lower quantities of hardener are incorporated but the required curing time is much longer and might reach as much as seven days.

The following examples show the effect of the use of multi-layers in heat insulating structures.

EXAMPLE 7

A mixture was prepared with the following components:

| Material | Parts by volume |
|---|---|
| Potassium aluminum sulfate, hydrated | 20 |
| Cement (hydraulic) | 4 |
| Water | 2 |

The ingredients were mixed in a cement mixer and the composition was poured into a metal box, 120 × 120 × 120 mm, open on one side (i.e., covering five sides).

The mixture was left for 72 hours for curing. A layer of polyurethane (20 mm thick) was glued to the hardened composition after curing, and a lower temperature mixture, selected from a list of salts of low temperature compositions, shown above, having a thickness of 10 mm was poured in the space at the middle of the polyurethane layer.

The box was exposed to heat according to a standard time-temperature curve for 60 minutes. The results are shown in FIG. 13. The mixture showed high heat retention and the curve exceeded the maximum allowable temperature of 52° C. after 75 minutes.

EXAMPLE 8

The mixture was prepared using a polyester binder instead of cement, according to the following proportions:

| Material | Parts by weight |
|---|---|
| Potassium aluminum sulfate, hydrated | 60% |
| Polyester | 30% |
| Aerosil ® (fused silica) | 10% |

The fused silica was added in order to decrease the density of the mixture. The mixture was hardened within two hours and showed a rather strong exothermic reaction during the curing process where the temperature reached 50°–60° C. Polyurethane and the low temperature mixture, noted above, were added in the following manner to form five sides of a cube, as described in Example 7.

The temperature gauge was placed between the polyurethane layer and the low temperature mixture layer to calculate the required thickness of the low temperature mixture, as shown in FIG. 13.

The calculated result based on the temperature curves of FIG. 13, had a required thickness of low temperature material of 5 mm per hour of exposure to heat, based on a heat of fusion of about 40 calories per gram at a temperature of 50°-60° C.

EXAMPLE 9

Rubberized layers containing potassium aluminum sulfate were prepared as in Example 3 and were arranged in the manner shown in FIG. 14. The sample was exposed to heat following a standard time-temperature curve for 30 minutes. The temperature curve shown in FIG. 14 (Example 9 curve) passes the test of the second scenario since the temperature reached 52° C. within the 150 minutes due to heat retention.

EXAMPLE 10

In this case, for weight reduction purposes, two layers of a commercially available endothermic mat material manufactured by 3M known as E-10A ® were used. The commercial mat density was 0.87 g/cc and is made up of ceramic fibers and inorganic endothermic material. The arrangement of the layers is shown in FIG. 14.

The expansion in this case was much smaller than in the previous rubberized layers since the E-10A is bonded with ceramic fibers.

The box was exposed to heat for one hour according to the standard time-temperature curves, and the results show reduction of temperature peak-up due to heat retention (see FIG. 14).

EXAMPLE 11

A comparative test was run to determine the placement or arrangement of the layers in regard to their endothermic reaction temperatures. FIG. 15 presents the arrangement of layers where arrangement B represents the different layers placed in the order of decreasing melting temperature and arrangement A comprises only potassium alum-based rubberized layers. For comparative purposes, the total thicknesses of the two arrangements are the same as shown in FIG. 15. Arrangement B results in a lower cold face temperature over the entire test period time (approximately four hours). This proves the advantage of using a multi-layered structure containing layers of compositions in decreasing melting temperature as a superior insulating material versus a layer of only one composition in equivalent thickness.

EXAMPLE 12

As shown in the previous examples, one of the problems encountered was the peak-up of temperature due to undesirable heat retention in the sample in the test kiln after the heat was turned off, which was so even after the kiln temperature dropped below the temperature of the sample.

In order to maintain the peak-up temperature due to heat retention below the desired cold face temperature, various solutions are feasible. Amongst these are an increase of the thickness of the internal layers, and increase in the thickness of the external layers, and an increase in the thickness of the polyurethane layer, both of which are costly, and increase the weight and thickness of the safe in which the compositions of the present invention would be used, for example.

The solution I have found is shown in FIG. 4 where layers 4b, 5 and 6 create a sub-system in order to prevent the retained heat in layers 2 and 4a to flow towards the inside cold face. The arrangements of layers as found in FIGS. 3 and 4 were comparatively tested. The time of heat exposure for both arrangements was for 60 minutes according to the standard time-temperature curve.

The overall thicknesses of these arranged layers was the same, i.e., about 90 mm each.

The results obtained from the arrangement of layers according to FIG. 4 is described in FIG. 16, which shows better heat insulation than the arrangement of layers according to FIG. 3.

Both curves of FIG. 16 would pass the test based on both fire scenarios, outlined above.

EXAMPLE 13

The conclusions arrived at from all the sets of tests were applied in the construction of a safe which was tested for one hour according to the standard time-temperature curve exposure.

The test was conducted by the Japanese Institute of Standards without any prior knowledge of the types of materials used in the safe. The structure shown in FIG. 17 was the structure of the safe which was tested.

The test was conducted according to the second scenario, i.e., the safe was exposed to heat for one hour and then sprayed with water.

The gauges were located as shown in FIG. 17 and the reading was taken from 4 gauges, each located 50 mm from each corner.

The kiln was a natural gas kiln where 2.5% temperature differences were allowed at various kiln points while following the time-temperature curve. The starting temperature was 31° C. inside and, by the end of the hour, the inside temperature reached 35° C. The safe was then sprayed with water and magnetic diskettes which were left inside during the test were checked for performance and any information loss. The diskettes showed no damage.

The expansion of the outer safe wall was about 30% greater than the original wall thickness with no concomitant damage to the inner portion of the safe.

A similar test was conducted using the first scenario with a sub-system arrangement described in Example 12 in order to determine heat retention protection. The temperature reached a level of 45° C. after three hours and then dropped gradually. This temperature was below the maximum allowable temperature of 52° C. for magnetic diskettes and, therefore, also passed the test.

EXAMPLE 14

For a heat insulation material having a higher relative density the following composition for an external layer is given:

| Ingredient | Amount (% by weight) |
| --- | --- |
| Inorganic, hydrated salt | 74–80 |
| Additive | 2 |
| Binder | 16–18 |
| Blowing agent | 2–6 |

This insulating material is prepared as previously described.

EXAMPLE 15

For a heat insulation material having a lower relative density, the following composition for an external layer is given:

| Ingredient | Amount (% by weight) |
| --- | --- |
| Inorganic, hydrated salt | 15-58 |
| Cork | 20-50 |
| Natural Rubber | 18 |
| Additives | 2 |
| Blowing agent | 2-6 |

The insulating material is prepared as previously described.

EXAMPLE 16

Another heat insulation composition having a low relative density of this invention follows:

| Ingredient | Amount (% by weight) |
| --- | --- |
| Inorganic, hydrated salt | 5-55 |
| Cork | 0-53 |
| Resin, or hydraulic cement (50% by weight in H$_2$O) | 30-40 |
| Blowing agent | 2-15 |

The binders are resins, synthetic or natural rubber or hydraulic cement.

The materials are mixed as previously described.

If a middle layer is to be placed between the external and internal layers forming a three-layer system it is preferred to use a foam material selected from polyurethane (rigid or flexible), phenol formaldehyde, styrofoam or foam rubber.

In a two layer system, the external layer should preferably have a thickness of 5-60 mm and the internal layer should have a thickness of 5-25 mm.

In a three layer-layer system, in addition to the external and interal layers noted above, a foam layer of 10-40 mm thickness should be used.

Multiples of the two-layer and three-layer sytems may also be used.

It is also noted that the layers of the insulating material may collapse or sag as a result of exposure to heat. It is therefore suggested that a wire mesh frame be included around the layer construction to prevent or inhibit this possibility.

I claim:

1. An insulation material for use in heat protective devices which comprises a structure having two or more layers, arranged so that the external layer has a higher melting temperature or temperature of dehydration than any layer, said external layer comprising:

an inorganic salt selected from the group consisting of Al$_2$(SO$_4$)$_3$.16-18H$_2$O, AlNH$_4$(SO$_4$)$_2$.24H$_2$O, KAl(SO$_4$)$_2$.12H$_2$O, and MgSO$_4$.7H$_2$O, and, a binder selected from the group consisting of natural rubber, neoprene rubber, silicone rubber, polyester resin, epoxy resin, phenolic resin and hydraulic cement.

2. An insulation material according to claim 1 wherein the inorganic salt is present in an amount of from 25-80% by weight and the binder is present in an amount of 20-80% by weight.

3. An insulation material according to claim 2 wherein cork, in the amount of 10-80% by weight, is incorporated therein.

4. An insulation material according to claim 2 wherein a blowing agent is included therein in an amount of 5-100 parts per 100 parts of the binder.

5. An insulation material according to claim 3 wherein a blowing agent is included therein in an amount of 5-100 parts per 100 parts of the binder.

6. An insulation material according to claim 2 for use in a safe or other structures having a door and a frame wherein the insulation material is arrayed in order to seal any space between the door and frame in the presence of a heat source to avoid penetration of a cooling agent, such as sprayed water.

7. An insulation material according to claim 1 wherein the internal layer or layers comprise an inorganic compound selected from the group consisting of Na$_2$S.9H$_2$O, Fe(NO)$_3$.9H$_2$O, and Na$_2$S$_2$O$_3$.5H$_2$O in a binder selected from the group consisting of natural rubber, neoprene rubber, silicone rubber, polyester resin, epoxy resin, phenolic resin and hydraulic cement.

8. An insulation material according to claim 7 wherein, in the internal layer, the inorganic compound is present in an amount of 20-80% by weight and the binder is present in an amount of 20-80% by weight.

9. An insulation material according to claim 4 wherein the blowing agent is azodicarbonamide.

10. An insulation material according to claim 2 wherein the external layer also comprises one or more additives.

11. A heat insulation material according to claim 2 wherein the external layer comprises 74-80% by weight of the inorganic salt, 16-18% by weight of the binder 2-6% by weight of a blowing agent and about 2% by weight of additives.

12. An insulation material according to claim 3 wherein the external layer comprises 15-58% by weight of the inorganic salt, 20-59% by weight of cork, about 18% by weight of natural rubber, 2 to 6% by weight of a blowing agent and about 2% by weight of additives.

13. An insulation material according to claim 3 wherein the external layer comprises 5 to 55% by weight of cork, 30 to 40% by weight of resin or hydraulic cement (50% by weight in water) and 2 to 15% by weight of a blowing agent.

14. An insulation material according to claim 7 wherein the internal layer comprises 50 to 70% by weight of the inorganic salt and 30 to 50% by weight of the binder.

15. An insulation material according to claim 1 wherein, in addition to an external and internal layer, a middle layer, selected from the group consisting of rigid polyurethane, flexible polyurethane, phenolformaldehyde, styrofoam and foam cement is present.

16. An insulation material according to claim 3 wherein, in addition to an external and internal layer, a middle layer, selected from the group consisting of rigid polyurethane, flexible polyurethane, phenol formaldehyde, styrofoam and foam cement is present.

17. An insulation material according to claim 4, wherein, in addition to an external and internal layer, a middle layer, selected from the group consisting of rigid polyurethane, flexible polyurethane, phenol formaldehyde, styrofoam and foam cement is present.

18. An insulation material according to claim 7 wherein, in addition to an external and internal layer, a middle layer, selected from the group consisting of rigid polyurethane, flexible polyurethane, phenol formaldehyde, styrofoam and foam cement is present.

19. An insulation material according to claim 15 wherein the middle layer is present in a thickness of 10 to 40 mm.

20. An insulation material according to claim 16 wherein the middle layer is present in a thickness of 10 to 40 mm.

21. An insulation material according to claim 17 wherein the middle layer is present in a thickness of 10 to 40 mm.

22. An insulation material according to claim 18 wherein the middle layer is present in a thickness of 10 to 40 mm.

* * * * *